(12) United States Patent
Walden

(10) Patent No.: US 12,452,393 B1
(45) Date of Patent: Oct. 21, 2025

(54) BUILDING ALARM SYSTEM FOR ACTIVE SHOOTER EMERGENCIES

(71) Applicant: Jackie Walden, Hartselle, AL (US)

(72) Inventor: Jackie Walden, Hartselle, AL (US)

( * ) Notice: Subject to any disclaimer, the term of this patent is extended or adjusted under 35 U.S.C. 154(b) by 177 days.

(21) Appl. No.: 18/369,898

(22) Filed: Sep. 19, 2023

(51) Int. Cl.
| | |
|---|---|
| *H04N 7/18* | (2006.01) |
| *G08B 21/02* | (2006.01) |
| *G08B 21/22* | (2006.01) |
| *G08B 25/01* | (2006.01) |
| *G08B 25/14* | (2006.01) |
| *G08B 27/00* | (2006.01) |

(52) U.S. Cl.
CPC ............. *H04N 7/188* (2013.01); *G08B 21/02* (2013.01); *G08B 21/22* (2013.01); *G08B 25/016* (2013.01); *G08B 25/14* (2013.01); *G08B 27/001* (2013.01); *H04N 7/183* (2013.01)

(58) Field of Classification Search
CPC ........ H04N 7/188; H04N 7/183; G08B 21/02; G08B 21/22; G08B 25/016
See application file for complete search history.

(56) References Cited

U.S. PATENT DOCUMENTS

| | | | |
|---|---|---|---|
| 7,468,663 B1 | 12/2008 | Rufolo, Jr. | |
| D591,186 S | 4/2009 | Harley | |
| 7,856,558 B2 | 12/2010 | Martin | |
| 9,111,430 B2 | 8/2015 | Kraus | |
| 9,734,644 B2 | 8/2017 | Samad | |
| 10,282,949 B2 | 5/2019 | Penland | |
| 11,576,127 B2 | 2/2023 | Amini | |
| 2004/0205823 A1 | 10/2004 | Tsai | |
| 2016/0239723 A1* | 8/2016 | Ge | G06V 20/52 |
| 2018/0310159 A1* | 10/2018 | Katz | H04M 3/42161 |
| 2020/0000162 A1* | 1/2020 | Spies | H04W 4/80 |
| 2021/0209877 A1* | 7/2021 | Neill | G06V 40/175 |
| 2023/0070772 A1* | 3/2023 | Bingham | G08B 19/005 |

* cited by examiner

*Primary Examiner* — Zhubing Ren

(57) ABSTRACT

The building alarm system for active shooter emergencies May include a security server, a wearable device, security server application software, call center application software, laptop application software, and wearable device application software. Responsive to an emergency call originating from a building, the building alarm system may be adapted to direct closest first responders to the building. The building alarm system may acquire one or more video feeds from a plurality of security cameras within the building and may be adapted to present the one or more video feeds to a dispatcher for review in order to locate an armed trespasser. The building alarm system may transmit a subset of the video feeds to individual first responders in order to provide the individual first responders with details regarding the location and activities of the armed trespasser.

16 Claims, 6 Drawing Sheets

BUILDING ALARM SYSTEM FOR ACTIVE SHOOTER EMERGENCIES

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of alarm systems, more specifically, a building alarm system for active shooter emergencies.

Summary of Invention

The building alarm system for active shooter emergencies May comprise a security server, a wearable device, security server application software, call center application software, laptop application software, and wearable device application software. Responsive to an emergency call originating from a building, the building alarm system may be adapted to direct closest first responders to the building. The building alarm system may acquire one or more video feeds from a plurality of security cameras within the building and may be adapted to present the one or more video feeds to a dispatcher for review in order to locate an armed trespasser. The building alarm system may transmit a subset of the video feeds to individual first responders in order to provide the individual first responders with details regarding the location and activities of the armed trespasser. As a non-limiting example, the armed trespasser may be an active shooter.

An object of the invention is to provide a security server executing security server application software within the building to transmit one or more video feeds, one or more audio feeds, or both to an emergency call center.

Another object of the invention is to provide call center application software executing on a call center computer to identify the building based upon the phone number of an emergency call, to contact the security server via the public internet, to receive one or more video feeds and/or one or more audio feeds from the security server, and to present the one or more video feeds to a dispatcher for the purpose of locating an armed trespasser.

A further object of the invention is to identify the closest first responders and to transmit a city map showing streets and the location of the building to laptop application software executing on a laptop in an emergency vehicle.

Yet another object of the invention is to transmit a subset of the one or more video feeds, a subset of the audio feeds, a building map, or any combination thereof to a wearable device worn by an individual first responder and executing wearable device application software so that the individual first responder may be made aware of the location and actions of the armed trespasser.

These together with additional objects, features and advantages of the building alarm system for active shooter emergencies will be readily apparent to those of ordinary skill in the art upon reading the following detailed description of the presently preferred, but nonetheless illustrative, embodiments when taken in conjunction with the accompanying drawings.

In this respect, before explaining the current embodiments of the building alarm system for active shooter emergencies in detail, it is to be understood that the building alarm system for active shooter emergencies is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the building alarm system for active shooter emergencies.

It is therefore important that the claims be regarded as including such equivalent construction insofar as they do not depart from the spirit and scope of the building alarm system for active shooter emergencies. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description. As used herein, the word "or" is intended to be inclusive.

Figure 1:
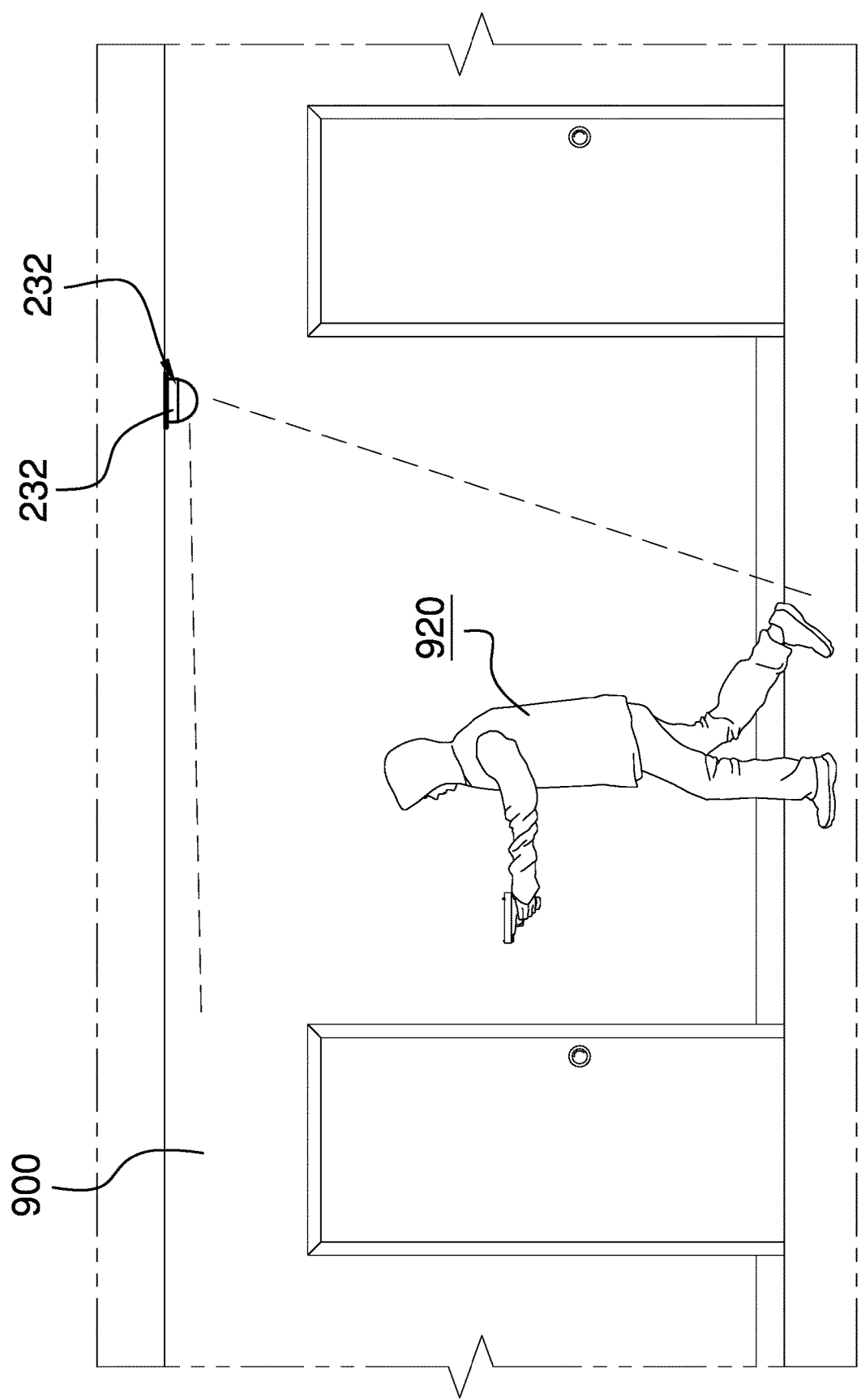
FIG. 1 is an in-use view of an embodiment of the disclosure, illustrating the armed trespasser walking through a hallway and being observed by a ceiling-mounted camera.
Figure 2:
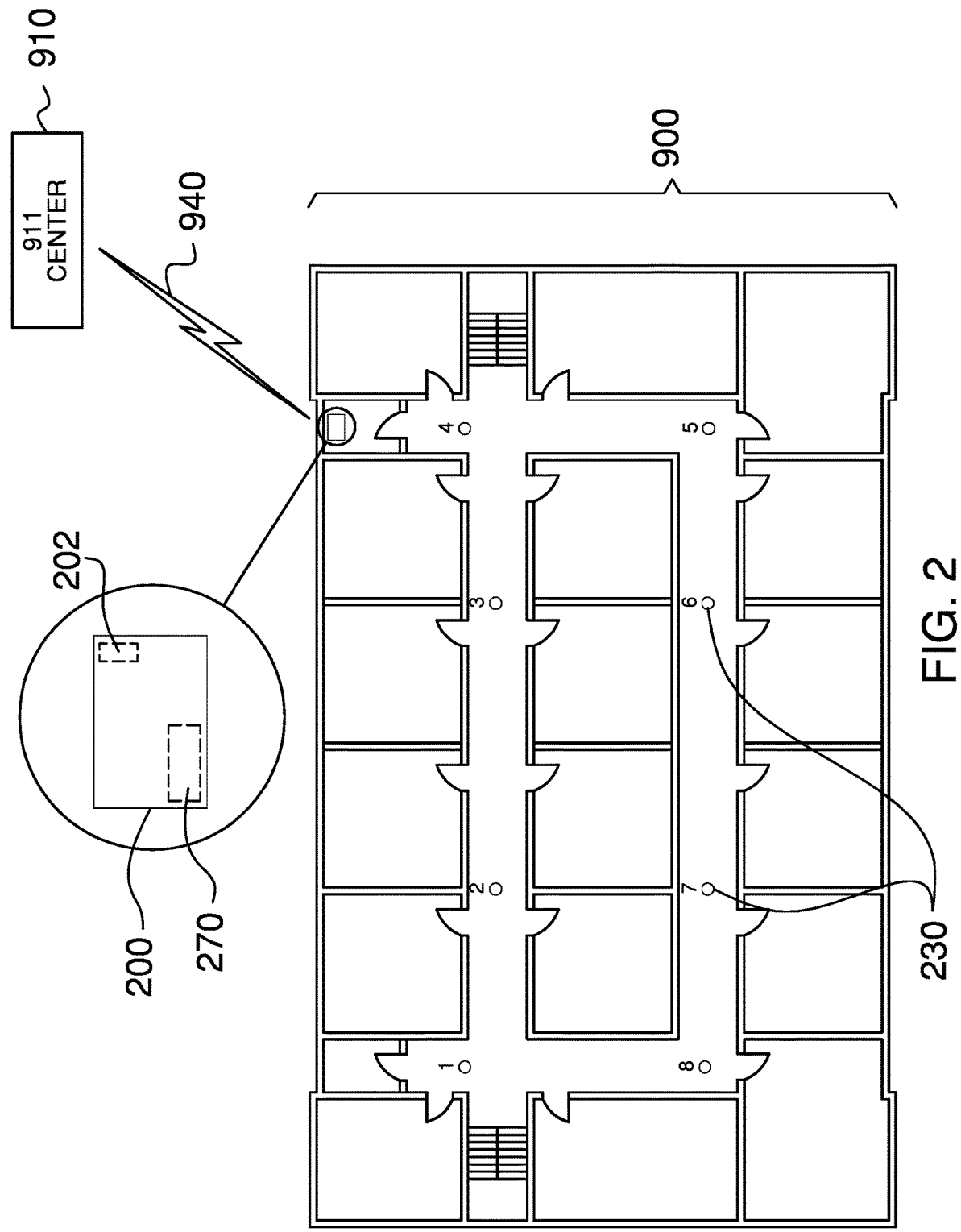
FIG. 2 is a top view of an embodiment of the disclosure, illustrating the placement of the security server and camera within the building.
Figure 3:
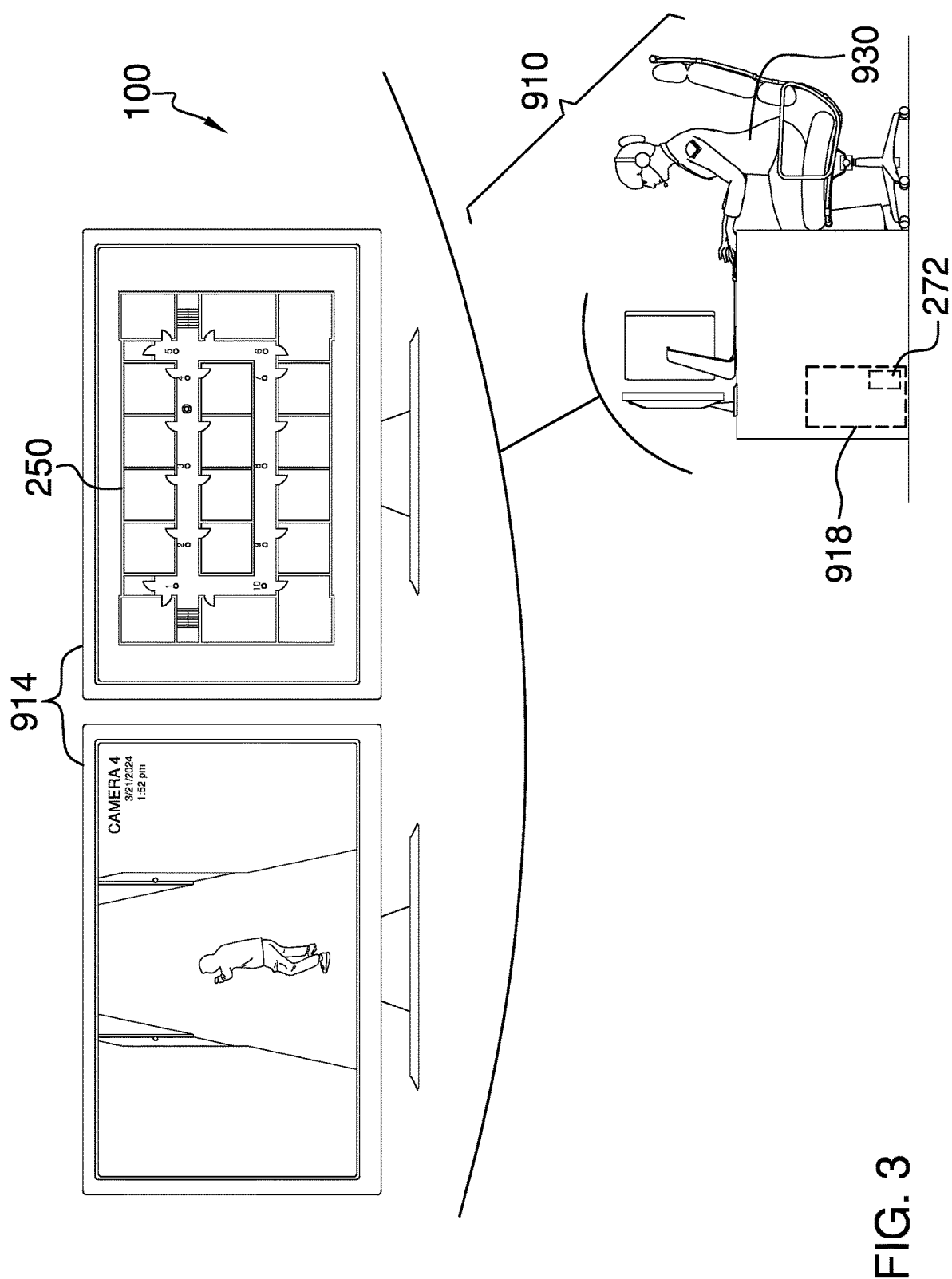
FIG. 3 is an in-use view of an embodiment of the disclosure, illustrating the emergency call center.
Figure 4:
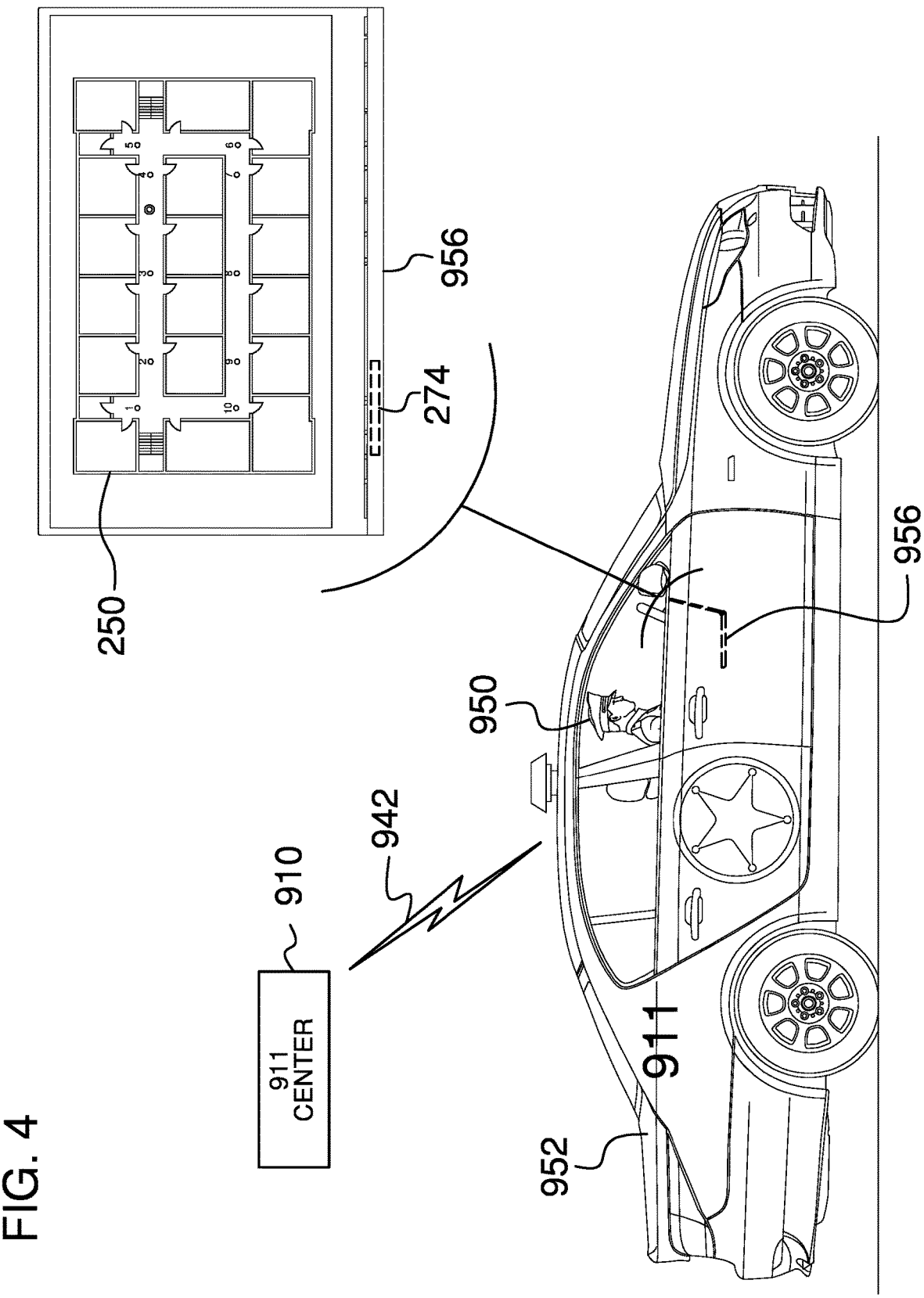
FIG. 4 is an in-use view of an embodiment of the disclosure, illustrating a first responder receiving information on a laptop in an emergency vehicle.
Figure 5:
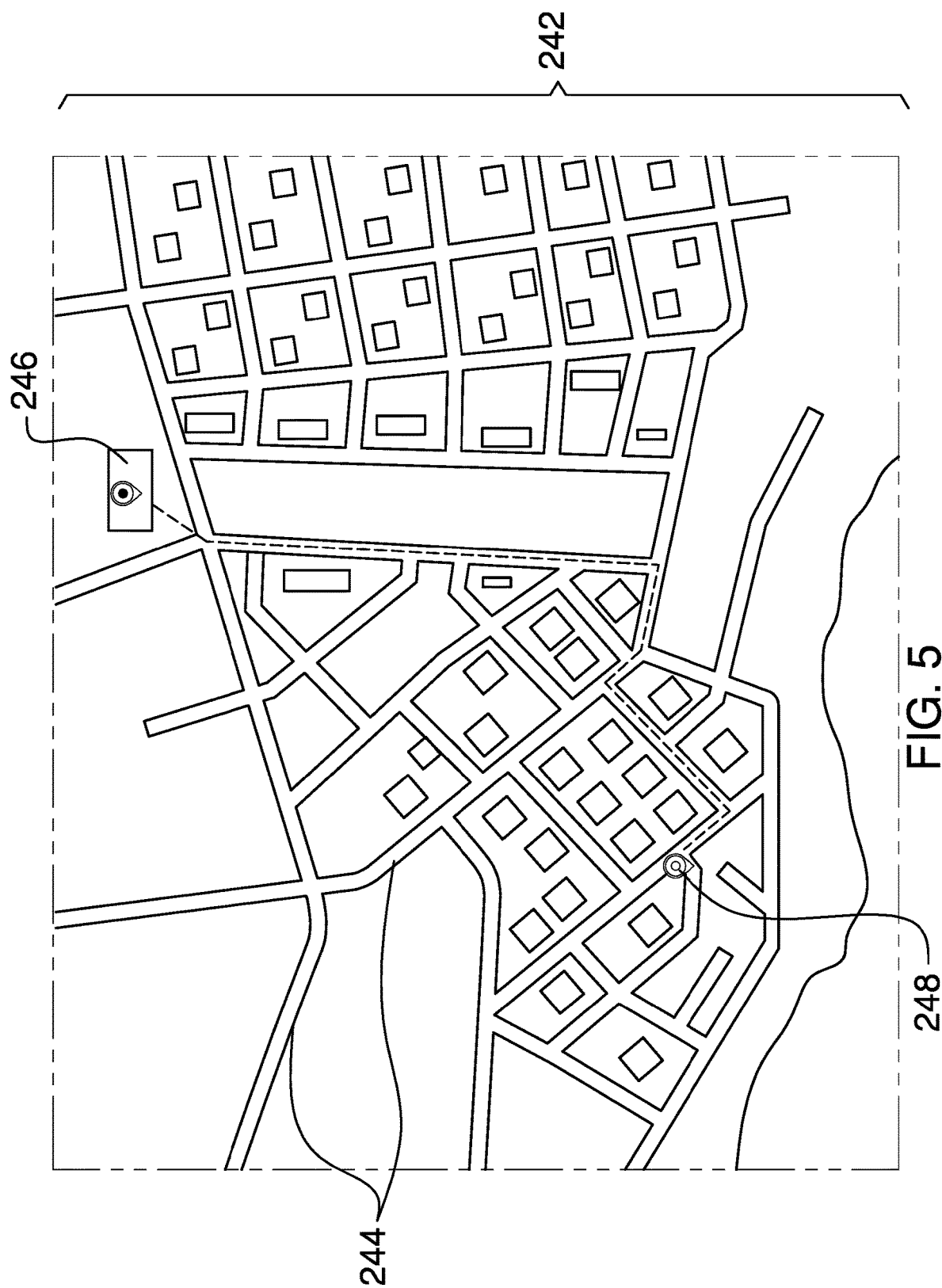
FIG. 5 is an in-use view of an embodiment of the disclosure, illustrating a city map as it might be shown on the laptop in an emergency vehicle.
Figure 6:
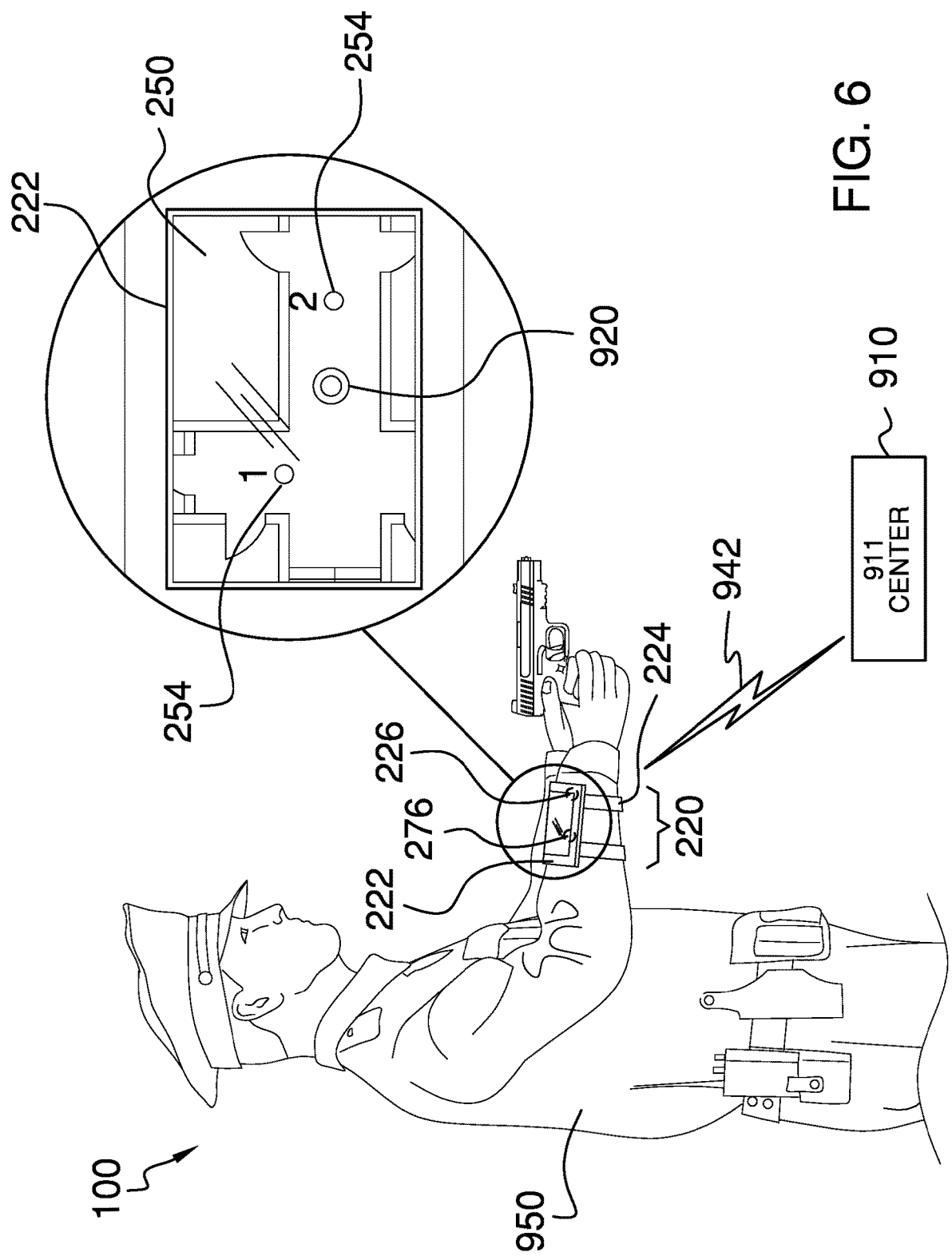
FIG. 6 is an in-use view of an embodiment of the disclosure, illustrating a first responder wearing the wearable device.

Detailed reference will now be made to a first potential embodiment of the disclosure, which is illustrated in FIGS. 1 through 6.

The building alarm system for active shooter emergencies 100 (hereinafter invention) comprises a security server 200, a wearable device 220, security server application software 270, call center application software 272, laptop application 9 software 274, and wearable device application software 276. Responsive to an emergency call originating from a building 900, the invention 100 may be adapted to direct closest first responders to the building 900. The invention 100 may acquire one or more video feeds from a plurality of security cameras 230 within the building 900 and may be adapted to present the one or more video feeds to a dispatcher 930 for review in order to16 locate an armed trespasser 920. The invention 100 may transmit a subset of the video feeds to individual first responders 950 in order to provide the individual first responders 950 with details regarding the location and activities of the armed trespasser 920. As a non-limiting example, the armed trespasser 920 may be an active shooter.

The security server 200 may be placed within the building 900 and may be registered with an emergency call center 910. As non-limiting examples, the building 900 may be a school, a church, an office building, a retail store, or a residence. Registration may comprise providing a street address, one or more phone numbers, a building map 250, a network address, a network password, and metadata. As non-limiting examples, the metadata may comprise PIN codes for keypad door locks and contact information for the building manager and owners. The building map 250 may comprise a building layout that shows the locations of rooms, hallways, camera positions 254, entrances, exits, stairwells, and elevators.

The security server 200 may be a computer system comprising a processor, memory, storage, and I/O subsystems. The security server 200 may be coupled to the plurality of security cameras positioned throughout the building 900 such that the outputs of the plurality of security cameras 230 are available to the security server 200. The connection between the plurality of security cameras 230 and the security server 200 may be wired, wireless, or any combination thereof. The security server 200 may comprise an onsite communication module 202 that may be operable to communicate with the emergency call center 910. As a non-limiting example, the security server 200 and the emergency call center 910 may communicate over a public internet 940 using a virtual private network (VPN).

A call center computer 918 at the emergency call center 910 may execute the call center application software 272. The call center application software 272 may be programmatically connected with the call handling software of the emergency call center 910 such that the call center application software 272 is notified of the phone number of all incoming emergency calls. Responsive to an incoming emergency call from an individual phone number registered as the one or more phone numbers of the building 900, the call center application software 272 may immediately retrieve the street address, the building map 250, the network address, and the network password for the building associated with the individual phone number. The call center application software 272 may then send a request for the one or more video feeds to the security server 200 at the building 900 via the public internet 940.

The call center application software 272 may be adapted to simultaneously identify the closest first responders by comparing locations of the individual first responders 950 obtained wirelessly from GPS units to the street address of the building 900. The call center application software 272 may transmit a city map 242 to the laptop application software 274 executing on a laptop computer 956 located within emergency response vehicles 952 of the closest first responders. The city map 242 may be displayed on the laptop computer 956 and may show streets 244, a building location 246, and location of emergency vehicles 248.

The security server 200 may execute the security server application software 270. The emergency call center 910 may present the requests to the security server 200 over the public internet 940 by sending the requests to the network address of the security server 200. Responsive to the requests have been authenticated using the network password, the security server application software 270 may select one or more individual security cameras 232 and may stream the one or more video feeds to the emergency call center 910.

The one or more video feeds may be displayed on one or more display consoles 914 at the emergency call center 910. The invention 100 may be adapted to permit the dispatcher 930 to review the one or more video feeds to determine the location within the building 900 of the armed trespasser 920. The call center application software 272 may be adapted to permit the dispatcher 930 to select the subset of the video feeds that best shows the armed trespasser 920. The call center application software 272 may transmit the subset of the video feeds, the building map 250, or any combination thereof to the laptop computer 956 in the emergency response vehicle 952 and to the wearable devices 220 that may be adapted to be worn by the individual first responders 950.

The wearable device 220 may be adapted for the individual first responder 950 to wear while on duty. As a non-limiting example, the wearable device 220 may be adapted to be worn on a forearm. The wearable device 220 may comprise a forearm display screen 222 and one or more arm straps 224. The one or more arm straps 224 may be adapted to retain the forearm display screen on the forearm such that the individual first responder 950 may observe video, photographs, and documents sent to the wearable device 220 from the emergency call center 910 and presented on the forearm display screen 222. The wearable device 220 may be adapted to present the subset of the video feeds selected by the dispatcher 930 such that the individual first responder 950 may monitor the movements and actions of the armed trespasser 920. The emergency call center 910 may communicate with the wearable device application software 276 executing on the wearable device 220 via an emergency response network 942. As a non-limiting example, the emergency response network 942 may be a police radio network.

The wearable device 220 may also be further defined to include and/or communicate with a body camera on the individual first responder 950. This body camera would provide another video that would be transmitted to the emergency call center 910.

The wearable device application software 276 may present the building map 250. The building map 250 may be adapted to indicate the location of the plurality of security cameras 230 and the armed trespasser 920 within the building 900. The wearable device 220 may be adapted to augment the building map using the metadata collected during registration and information collected by the security server 200 and transmitted to the individual first responder 950 via the emergency call center 910. As non-limiting examples, the wearable device 220 may present the state locked/unlocked of door locks, PIN codes for keypad door locks, the status of elevator operation, the status of a fire alarm system, or any combination thereof.

The wearable device 220 may be battery-powered.

In some embodiments, the security server 200 may transmit one or more audio feeds originating at microphones 234 on the plurality of security cameras 230 to the emergency call center 910 along with the one or more video feeds from the plurality of security cameras 230. A subset of the audio feeds may be transmitted from the emergency call center 910 to the wearable device 220 along with the subset of the video feeds. An audio transducer 226 on the wearable device 220 may be adapted to play the subset of the audio feeds to the individual first responder 950.

The call center application software 272 may be adapted to record the one or more video feeds, the one or more audio feeds, the city map 242, the building map 250, other information transmitted to the individual first responders 950, or any combination thereof from the beginning of the emergency call until such time as the threat is declared to be neutralized.

In use, a security server 200 may be installed within a building 900 such that the security server 200 may access the output of the plurality of security cameras 230 within the building 900. The security server 200 may be registered with an emergency call center 910 such that the emergency call center 910 may communicate with the security server 200 during emergencies.

An emergency call placed from the building 900 to the emergency call center 910 may trigger the call center application software 272 to match the calling number with an individual phone number selected from one or more phone numbers that were provided during registration, thus identifying the building 900 where the call originates. The call center application software 272 may communicate with the security server 200 via the public internet 940 and may request that the one or more video feeds from the plurality of security cameras 230 be sent to the call center application software 272. Simultaneously, the call center application software 272 may locate the closest first responders and may transmit a city map 242 to laptop application software 274 executing on laptop computers 956 within the emergency response vehicles 952 of the closest first responders. The city map 242 may show the location of the closest first responders, the building location 246, and the streets 244 such that the closest first responders may be guided to the building 900.

The call center application software 272 may further transmit a subset of the video feeds selected by the dispatcher 930 and a building map 250 to a wearable device 220 worn by the individual first responders 950. The building map 250 may show the building layout and the location of the armed trespasser 920.

Definitions

As used in this disclosure, an "application" or "app" may be software that is designed to perform one or more specific tasks on a personal computing device, smart phone, or some other computing device.

As used in this disclosure, a "camera" may be a sensor that converts light into electric signals that encode the spatial orientation of the captured light in a manner that reproduces the images seen by a human eye.

As used herein, the words "couple", "couples", "coupled" or "coupling", may refer to connecting, either directly or indirectly, and does not necessarily imply a mechanical connection.

As used herein, the words "data" and "information" may be used interchangeably to refer to raw, unprocessed facts and to facts that have been processed, structured, organized, or presented in a context that makes the facts useful.

As used in this disclosure, a "laptop computer" may be a computer that incorporates into a single housing: 1) a mechanism to provide tactile inputs; 2) a mechanism to provide visual and audio outputs; 3) a mechanism to receive digital or analog inputs from an external mechanical device; and, 4) a mechanism to provide digital or analog outputs to an external mechanical device. The single housing is sized such that the laptop computer can be transported by a single person.

As used in this disclosure, a "microphone" may be a transducer that converts the energy from vibration into electrical energy. The sources of vibrations include, but are not limited to, acoustic energy.

As used herein, the terms "processor", "central processor", "central processing unit", "CPU", or "microprocessor" may refer to a digital device that carries out the instructions comprising a computer program by performing basic arithmetic, logical, control, and input/out operations. The term "microprocessor" may additionally imply a level of miniaturization and power reduction that makes the device suitable for portable or battery operated systems.

As used in this disclosure, a "transducer" may be a device that converts a physical quantity, such as pressure or brightness into an electrical signal or a device that converts an electrical signal into a physical quantity.

As used in this disclosure, "wireless" may be an adjective that is used to describe a communication channel that does not require the use of physical cabling.

With respect to the above description, it is to be realized that the optimum dimensional relationship for the various components of the invention described above and in FIGS. 1 through 6, include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A building alarm system for active shooter emergencies comprising:

a security server, a wearable device, security server application software, call center application software, laptop application software, and wearable device application software;

wherein responsive to an emergency call originating from a building, the building alarm system for active shooter emergencies is adapted to direct closest first responders to the building;

wherein the building alarm system for active shooter emergencies acquires one or more video feeds from a plurality of security cameras within the building and is adapted to present the one or more video feeds to a dispatcher for review in order to locate an armed trespasser;

wherein the building alarm system for active shooter emergencies transmits a subset of the video feeds to individual first responders;

wherein the security server is placed within the building and is registered with an emergency call center;

wherein registration comprises providing a street address, one or more phone numbers, a building map, a network address, a network password, and metadata;

wherein the call center application software is adapted to simultaneously identify the closest first responders by comparing locations of the individual first responders obtained wirelessly from GPS units to the street address of the building;

wherein the call center application software transmits a city map to the laptop application software executing on a laptop computer located within emergency response vehicles;

wherein the city map is displayed on the laptop computer and shows streets, the location of the building, and locations of emergency vehicles;

wherein the wearable device is adapted to be worn on a forearm;

wherein the wearable device comprises a forearm display screen and one or more arm straps;

wherein the one or more arm straps are adapted to retain the forearm display screen on the forearm such that the individual first responder observes video, photographs, and documents sent to the wearable device from the emergency call center and presented on the forearm display screen;

wherein the wearable device is adapted to present the subset of the video feeds selected by the dispatcher such that the individual first responder monitors the movements and actions of the armed trespasser.

2. The building alarm system for active shooter emergencies according to claim 1
wherein the building map comprises a building layout that shows the locations of rooms, hallways, camera positions, entrances, exits, stairwells, and elevators.

3. The building alarm system for active shooter emergencies according to claim 2
wherein the security server is a computer system comprising a processor, memory, storage, and I/O subsystems;
wherein the security server is coupled to the plurality of security cameras positioned throughout the building such that the outputs of the plurality of security cameras are available to the security server;
wherein the connection between the plurality of security cameras and the security server is wired, wireless, or any combination thereof.

4. The building alarm system for active shooter emergencies according to claim 3
wherein the security server comprises an onsite communication module that is operable to communicate with the emergency call center.

5. The building alarm system for active shooter emergencies according to claim 4
wherein the security server and the emergency call center communicate over a public internet using a virtual private network.

6. The building alarm system for active shooter emergencies according to claim 4
wherein a call center computer at the emergency call center executes the call center application software;
wherein the call center application software is programmatically connected with the call handling software of the emergency call center such that the call center application software is notified of the phone number of all incoming emergency calls;
wherein responsive to an incoming emergency call from an individual phone number registered as the one or more phone numbers of the building, the call center application software retrieves the street address, the building map, the network address, and the network password for the building associated with the individual phone number;
wherein the call center application software sends a request for the one or more video feeds to the security server at the building via the public internet.

7. The building alarm system for active shooter emergencies according to claim 6
wherein the security server executes the security server application software;
wherein the emergency call center presents the request to the security server over the public internet by sending the request to the network address of the security server;
wherein responsive to the requests have been authenticated using the network password, the security server application software selects one or more individual security cameras and streams the one or more video feeds to the emergency call center.

8. The building alarm system for active shooter emergencies according to claim 7
wherein the one or more video feeds are displayed on one or more display consoles at the emergency call center;
wherein the building alarm system for active shooter emergencies is adapted to permit the dispatcher to review the one or more video feeds to determine the location within the building of the armed trespasser;
wherein the call center application software is adapted to permit the dispatcher to select the subset of the video feeds that best shows the armed trespasser;
wherein the call center application software transmits the subset of the video feeds, the building map, or any combination thereof to the laptop computer in the emergency response vehicle and to the wearable devices.

9. The building alarm system for active shooter emergencies according to claim 8
wherein the wearable device is adapted for the individual first responder to wear while on duty.

10. The building alarm system for active shooter emergencies according to claim 9
wherein the emergency call center communicates with the wearable device application software executing on the wearable device via an emergency response network.

11. The building alarm system for active shooter emergencies according to claim 10
wherein the emergency response network is a police radio network.

12. The building alarm system for active shooter emergencies according to claim 10
wherein the wearable device application software presents the building map;
wherein the building map is adapted to indicate the location of the plurality of security cameras and the armed trespasser within the building;
wherein the wearable device is adapted to augment the building map using the metadata collected during registration and information collected by the security server and transmitted to the individual first responder via the emergency call center.

13. The building alarm system for active shooter emergencies according to claim 12
wherein the wearable device presents the state locked/unlocked of door locks, PIN codes for keypad door locks, the status of elevator operation, the status of a fire alarm system, or any combination thereof.

14. The building alarm system for active shooter emergencies according to claim 12
wherein the wearable device is battery-powered.

15. The building alarm system for active shooter emergencies according to claim 14
wherein the security server transmits one or more audio feeds originating at microphones on the plurality of security cameras to the emergency call center along with the one or more video feeds from the plurality of security cameras;
wherein a subset of the audio feeds is transmitted from the emergency call center to the wearable device along with the subset of the video feeds;
wherein an audio transducer on the wearable device is adapted to play the subset of the audio feeds to the individual first responder.

16. The building alarm system for active shooter emergencies according to claim 15
wherein the call center application software is adapted to record the one or more video feeds, the one or more audio feeds, the city map, the building map, other information transmitted to the individual first responders, or any combination thereof from the beginning of the emergency call until such time as the armed trespasser is declared to be neutralized.

* * * * *